United States Patent
Lipari (10) Patent No.: US 10,285,416 B2
(45) Date of Patent: May 14, 2019

(54) APPARATUS AND METHODS FOR DETAILING WITH EDIBLE GOODS

(71) Applicant: George John Lipari, Morris Plains, NJ (US)

(72) Inventor: George John Lipari, Morris Plains, NJ (US)

( * ) Notice: Subject to any disclaimer, the term of this patent is extended or adjusted under 35 U.S.C. 154(b) by 161 days.

(21) Appl. No.: 15/198,109

(22) Filed: Jun. 30, 2016

(65) Prior Publication Data
US 2018/0000111 A1  Jan. 4, 2018

(51) Int. Cl.
| | | |
|---|---|---|
| A21B 3/13 | (2006.01) |
| A23G 3/20 | (2006.01) |
| A23G 3/28 | (2006.01) |
| A23G 3/34 | (2006.01) |
| A47J 43/28 | (2006.01) |
| B05C 11/02 | (2006.01) |
| B05C 13/00 | (2006.01) |

(Continued)

(52) U.S. Cl.
CPC ........... *A23G 3/2023* (2013.01); *A23G 3/007* (2013.01); *A23G 3/28* (2013.01); *A23G 3/54* (2013.01); *B05C 11/028* (2013.01); *B65D 21/0209* (2013.01); *A21B 3/134* (2013.01); *A23V 2002/00* (2013.01); *A47J 43/288* (2013.01); *B05C 13/00* (2013.01)

(58) Field of Classification Search
CPC ........... A21B 3/13; A21B 3/131; A21B 3/132; A21B 3/134; A21B 5/00; A21B 5/02; B05C 13/00; B05C 11/028; B05C 11/045; B05C 11/04; B65D 21/0209; A23G 3/28; A23G 3/2023; A23G 3/54; A23G 3/007; A23G 3/343; A21C 15/002; A47J 43/288; A47J 27/13; A23P 20/15; A23V 2002/00
USPC .... 118/13, 14; 249/119, 126, 160, 155, 156, 249/DIG. 1; D7/610, 615, 354; 99/426, 99/427, 442, 439, 432; 220/573.1, 912, 220/4.26; 206/503, 505, 506, 509, 499; 426/302–307
See application file for complete search history.

(56) References Cited

U.S. PATENT DOCUMENTS

| | | | | |
|---|---|---|---|---|
| 1,223,226 | A | * | 4/1917 | Wells ............ B28B 7/0014 249/169 |
| 1,710,369 | A | * | 4/1929 | Martin ............ A21C 9/06 249/142 |
| 2,004,501 | A | | 6/1935 | Curtis |

(Continued)

*Primary Examiner* — Laura Edwards (57) ABSTRACT

A first edible layer is placed atop a tray and inside a first annular member, leaving an annular gap around the edible layer. A spreadable material is spread atop and laterally on the first edible layer. A second annular member is stacked upon the first annular member with a second edible layer centered in the second member but with an annular gap between the two. Spreadable material atop and laterally to the second edible layer. The annular members each have an overall transverse dimension greater than its height. These members are part of a reusable kit with the first member has an outwardly projecting pair of handles A tool for shaping spreadable material is shown as a plate with an opposite pair of finishing edges, one being straight, the other undulating. The lower edge of the tool is located between the finishing edges, and has an opposite pair of guide notches. Each of the notches can be pressed against the edge of the tray to regulate the tool's working depth.

19 Claims, 6 Drawing Sheets

(51) Int. Cl.
   *B65D 21/02* (2006.01)
   *A23G 3/54* (2006.01)

(56) References Cited

U.S. PATENT DOCUMENTS

| | | | |
|---|---|---|---|
| 2,969,902 A | 5/1957 | Cage | |
| 2,861,322 A | 11/1958 | Benes | |
| 2,907,486 A * | 10/1959 | Perez | B65F 1/141 |
| | | | 220/4.26 |
| 3,997,072 A * | 12/1976 | Guth | B65F 1/06 |
| | | | 100/229 A |
| 4,091,929 A | 5/1978 | Krane | |
| 4,114,265 A * | 9/1978 | Bailey | A47G 21/045 |
| | | | 30/122 |
| 4,222,493 A * | 9/1980 | Friedman | A47J 27/13 |
| | | | 220/8 |
| D275,065 S * | 8/1984 | Steiner | D7/650 |
| D275,723 S | 10/1984 | Leininger | |
| 4,629,221 A | 12/1986 | Lumsden et al. | |
| 4,762,233 A | 8/1988 | Sears et al. | |
| 5,015,014 A | 5/1991 | Sweeney | |
| 5,203,641 A | 4/1993 | Kranich | |
| D345,887 S | 4/1994 | Heiberg | |
| 5,409,128 A * | 4/1995 | Mitchell | B65D 21/022 |
| | | | 206/508 |
| 5,474,195 A * | 12/1995 | Pai | B62J 9/00 |
| | | | 220/4.26 |
| 5,585,123 A | 12/1996 | Busby | |
| 6,253,454 B1 | 7/2001 | Gietzen | |
| D499,851 S | 12/2004 | Kortleven | |
| 7,000,564 B2 | 2/2006 | Franczyk | |
| 7,163,185 B2 | 1/2007 | Dail | |
| 7,225,929 B2 | 6/2007 | Forsyth | |
| 9,289,089 B1 * | 3/2016 | Premraj | A47J 27/13 |
| 2011/0226109 A1 | 9/2011 | Caputo | |
| 2014/0050833 A1 * | 2/2014 | Stith | A47J 36/06 |
| | | | 426/509 |
| 2014/0366384 A1 * | 12/2014 | Costa | A47J 43/288 |
| | | | 30/123 |
| 2015/0164089 A1 | 6/2015 | Allison et al. | |

\* cited by examiner

APPARATUS AND METHODS FOR DETAILING WITH EDIBLE GOODS

BACKGROUND OF THE INVENTION

1. Field of the Invention

The present invention relates to edible goods, and in particular, to the making and finishing of layered cakes.

2. Description of Related Art

A layer cake may be made from separately baked layers of cake that are later brought together. Typically, icing, filling or other spreadable material is placed atop a first layer before placing a second layer on top of the first. This process can be repeated to create a cake with three or more layers. After the cake layers are stacked in this fashion, icing or other spreadable material can be spread on the top and sides of the layered cake. Thereafter, the layered cake can be decorated in the usual fashion with icing taking the form of borders, flowers, lettering, etc.

The baked layers must be stacked and the spreadable material must be applied symmetrically to give the finished product a professional appearance. In particular, care must be taken not to shift any layers when applying icing or other spreadable material to the side of the product.

See also U.S. Pat. Nos. 2,004,501; 2,969,902; 4,091,929; 4,629,221; 4,762,233; 5,015,014; 7,163,185; and 7,225,929, as well as U.S. Patent Application Publication No. 2011/0226109.

SUMMARY OF THE INVENTION

In accordance with the illustrative embodiments demonstrating features and advantages of the present invention, there is provided a method for finishing a plurality of edible layers with spreadable material. The method uses a plurality of annular members. The method includes the step of placing a first one of the plurality of edible layers inside a first one of the plurality of annular members, leaving an annular gap between them. The method also includes the step of applying the spreadable material atop and laterally to the first one of the plurality of edible layers. Another step is coaxially stacking a second one of the plurality of annular members upon the first one of the plurality of annular members. The method also includes the step of centering a second one of the plurality of edible layers inside the second one of the plurality of annular members and atop the first one of the plurality of edible layers. An annular gap is left between the second one of the plurality of edible layers and the second one of the plurality of annular members. Another step is applying the spreadable material atop and laterally to the second one of the plurality of edible layers.

In accordance with another aspect of the invention, a kit is provided for finishing a plurality of edible layers with spreadable material. The kit includes a plurality of annular members. A first one of the annular members has an outwardly projecting pair of handles Each of the plurality of annular members is coaxially stackable and is separable after stacking for reuse. Each of the plurality of annular members is sized to encompass a corresponding one of the plurality of edible layers and leave an annular gap sized to admit the spreadable material. Each of the plurality of annular members has an overall transverse dimension and height. The overall transverse dimension exceeds the height.

In accordance with yet another aspect of the invention, a tool is provided for shaping spreadable material on one or more edible layers resting on a tray. The tool includes a plate with an opposite pair of finishing edges, one being straight, the other undulating. The pair of finishing edges are adapted to shape the spreadable material on the one or more edible layers The plate has a lower edge between the opposite pair of finishing edges. This lower edge has an opposite pair of guide notches. Each of the notches is adapted to press peripherally against the tray to give the plate a regulated working depth.

By employing apparatus and methods of the foregoing type, an improved technique is achieved for finishing edible goods. The disclosed embodiment employs a number of stackable annular members. In this embodiment the first annular member is a ring with a pair of diametrically opposed handles protruding outwardly from the wall of the annular member. The wall of this first member can fit into an annular receptacle, in the form of a groove in a tray.

A second annular member can be stacked atop the first This second member has a wall with an outward jog or step that creates a lower abutment that can rest atop the rim of the first annular member. The lower portion of this second member extends downwardly to form a retaining wall that embraces the first annular member to center the second annular member thereon. The third annular member, shaped the same as the second, may be stacked in a similar fashion on the second one. The stack can be increased with a fourth annular member, a fifth, etc.

Before using these components, one would first prepare several edible layers, for example, by baking two or more layers of cake. Once the layers have sufficiently cooled, the user would place the first annular member in the tray's groove, and insert a first baked layer inside this first member, resting on the top the tray. In some cases the order may be reversed, and the baked layer may be laid on the tray before placing the first annular member around the baked layer.

Next, a spreadable material such as whipped cream may be spread on the top and sides of the first baked layer while located inside the first annular member. The spreadable material may be applied on top with any convenient kitchen implement such as a knife or spatula. A layer of spreadable material may be inserted in the gap between the first annular member and the baked layer, using an ordinary kitchen implement or a conventional decorating bag. This bag may be a tube filled with the spreadable material and squeezed to eject a column of the spreadable material out through a nozzle at the distal end of the bag. The thus ejected spreadable material can then be conveniently deployed to fill the gap between the first baked layer and the first annular member.

Thereafter, a second edible layer (which may also be a baked layer of cake) may be stacked atop the first baked layer with the second annular member placed atop the first annular member. The second baked layer may be laid in place before the second annular member, or vice versa. As before, a spreadable material can be deposited on the top and side of the second baked layer. The stack can be built up by employing a third baked layer and third annular member, and so forth.

Once the desired number of baked layers have been stacked and covered with spreadable material, the user may grasp the handle on the first annular member and lift all of the annular members simultaneously. The user now has a stack of baked layers with spreadable material between them and on top and sides of the stack.

The user may now wish to smooth or comb the surface of the spreadable material on the top and sides of the stack This may be performed with a disclosed tool that has multiple surface-finishing edges. One such edge may be straight for simple smoothing, while the other edge may have a plurality of teeth for combing the spreadable material and creating a fluted surface.

In one embodiment, the layered cake may be transported on its tray and placed atop a turntable. The disclosed tool will have along its lower edge an opposing pair of notches, each associated with one of the tool's distinct surface-finishing edges A selected one of the finishing edges may be placed pressed against the spreadable material on the side of the layered cake. Simultaneously, the notch associated with the chosen finishing edge will be pressed against the edge of the cake tray to limit the working depth of the finishing edge.

With the tool thus positioned, the user may now rotate the turntable, while keeping the tool stationary but with its notch pressed against the edge of the cake tray. This configuration is especially useful when using the toothed edge of the tool, since the flutes formed in the spreadable material will be uniform and parallel.

The user may now decorate the layered cake in the usual fashion by applying icing or other spreadable material in the form of decorative borders, flowers, lettering, etc.

The foregoing annular members and tray are machine-washable and may be reused in the manner just described.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION

Referring to FIGS. 1, 2A-2D, and 3, a kit for finishing a plurality of edible layers includes a first annular member 10, second annular member 12, and third annular member 14. Annular members will be machine-washable and may be made of stainless steel, but other embodiments may employ aluminum, plastics, ceramics, composite materials, etc.

Figure 1:
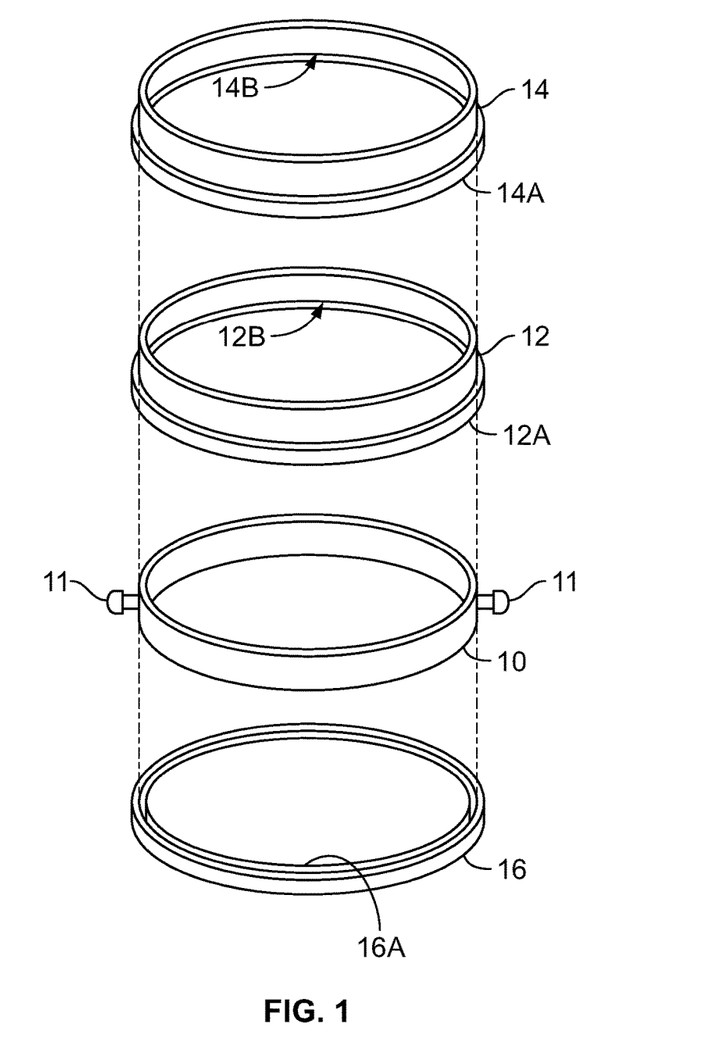
FIG. 1 is an exploded view of annular members and a tray in accordance with principles of the present invention.

Annular member 10 is a simple circular band with a wall having a rectangular cross section. Member 10 has on diametrically opposite sides a pair of outwardly extending handles 11 having a mushroom-like shape (although other shapes can be used, including T-shaped handles, or a simple stud).

The diameter (or overall transverse dimension) of annular member 10 may be in the range of 5 to 24 inches (13 to 61 cm), while the overall height may be in the range of 1 to 10 inches (2.5 to 25 cm), although these ranges can be altered without departing from the scope of the invention. These dimensional ranges are applicable to members 12 and 14, as well.

Annular member 12 is also a circular band but has a lower retaining wall 12A that is offset in a radially outward direction from the upper main wall, thereby creating a lower abutment 12B. This radial offset is also referred to as a step or a jog. Annular member 12 has a uniform thickness throughout; that is, from the top down through lower retaining wall 12A. Third annular member 14 is identical to annular member 12, in this embodiment.

Figure 2A:
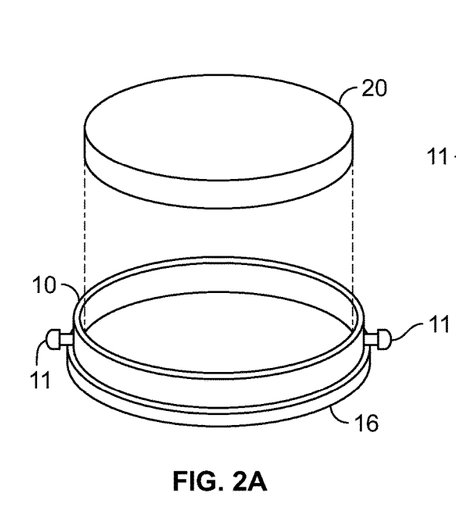
FIGS. 2A through 2D show steps performed with the apparatus of FIG. 1 to deal with edible goods.

Tray 16 is shown as a circular panel with an annular rectangular groove 16A that acts as a receptacle for receiving the lower edge of annular member 10, as shown in FIG. 2A.

Figure 2B:
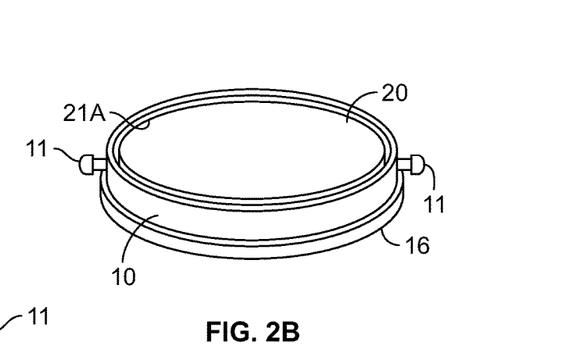

In FIGS. 2A and 2B edible layer 20 is shown being inserted into annular member 10 to rest atop tray 16. In some instances, edible layer 20 will be placed on tray 16, before placing annular member 10 around the layer.

Layer 20 may be any one of a variety of cakes that are typically baked in a cake pan in an oven. Alternatively, edible layer 20 may be a composition that is mixed and allowed to form a solid or semi-solid mass, without baking. In some embodiments, layer 20 may be ice cream, a brownie, mousse-like substance, etc.

Edible layer 20 may be accurately centered inside member annular member 10 by making sure that the annular gap 21A between member 10 and layer 20 is uniform. In some cases layer 20 may need to be trimmed to fit inside annular member 10 and exhibit a uniform annular gap 21A. In some embodiments, the kit of FIG. 1 may include a number of baking pans (not shown) that are dimensioned to produce a baked layer that is the correct size for members 10, 12, and 14.

Spreadable material can be placed on edible layer 20 after it and annular member 10 are placed on tray 16 as shown in FIG. 2B. The spreadable material can be icing, whipped cream, a filling, etc. The user may apply the spreadable material with ordinary kitchen utensils such as a knife, spoon, spatula, etc The spreadable material may be applied on top of layer 20 in a straightforward manner. Spreadable material will also be pressed into gap 21A to cover the sides of edible layer 20. As described further hereinafter, spreadable material may be injected into gap 21A using extruding apparatus, such as a decorating bag. In some cases the spreadable material on top will be different from that on the sides of layer 20.

Figure 2C:
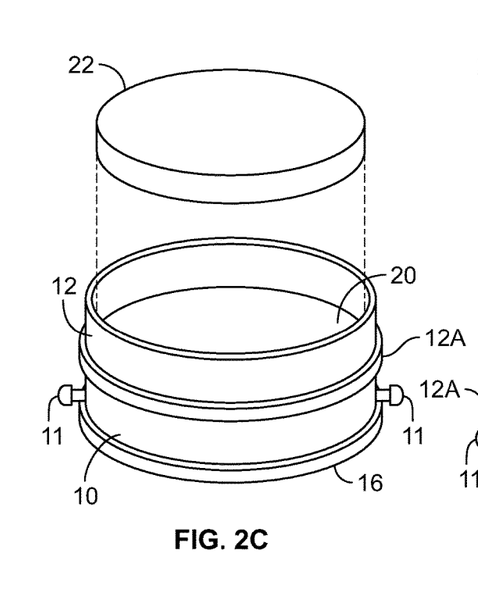
Figure 3:
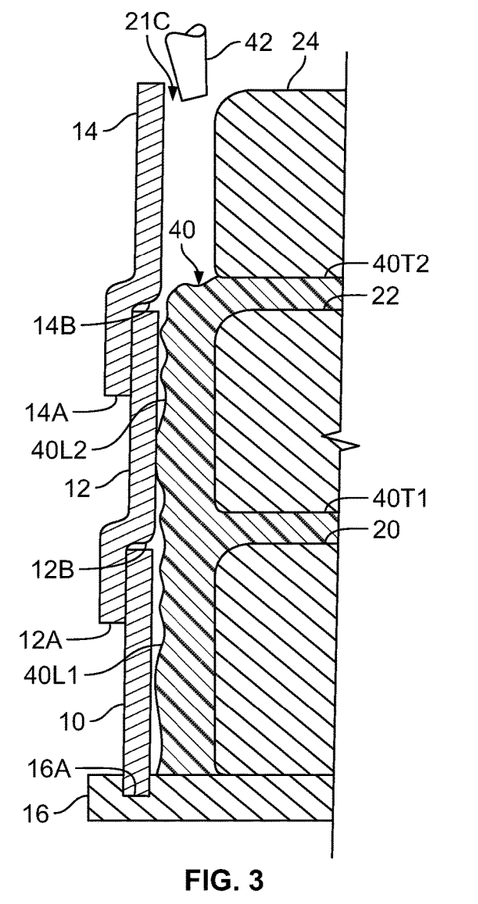
FIG. 3 is a fragmentary, sectional view of the apparatus of FIG. 1 assembled and containing edible layers, some covered with spreadable material.

Referring to FIGS. 2C and 3, annular member 12 is shown installed atop annular member 10. Specifically, lower retaining wall 12A is positioned to encircle the upper portion of member 10 with abutment 12B resting on the rim of member 10. Retaining wall 12A ensures that members 10 and 12 are aligned and their inner sides present a substantially continuous surface.

Next, edible layer 22 is inserted inside annular member 12 above layer 20 (although placement of the annular member may precede placement of the layer 20 in some instances).

It will be understood that the top of layer 20 has been covered with spreadable material 40 and therefore layer 22 will be pressed downwardly to substantially eliminate any air gaps and avoid any tilting of layer 22. The juncture between layers 20 and 22 is identified in FIG. 3 as a layer 40T1 of spreadable material 40 disposed between edible layers 20 and 22. It will be further noticed that the side of edible layer 20 has already been covered with a layer 40L1 of spreadable material 40.

Figure 2D:
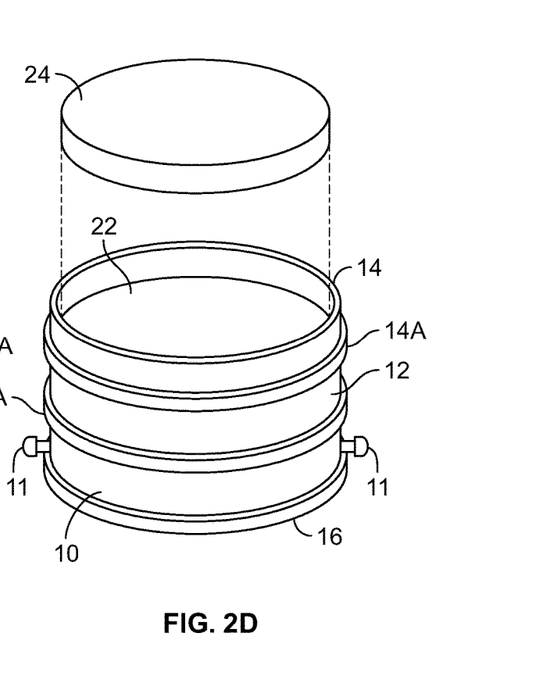

In FIG. 3 the top of layer 22 has already been covered with a layer 40T2 of spreadable material 40. Also, a layer of spreadable material 40L2 has been applied to the side of layer 22. In FIG. 3 edible layer 24 has been pressed atop spreadable material 40 of layer 40T2. The insertion of layer 24 is also shown in FIG. 2D. In addition, the third annular member 14 has been installed with its retaining wall 14A encircling the upper portion of member 12, and with its abutment 14B resting on the rim of member 12.

In FIG. 3 edible layer 24 has been positioned with a uniform annular gap 21C between the layer and annular member 14. Once positioned, spreadable material 40 can be placed on the top and side of layer 24. FIG. 3 shows nozzle 42 of a decorator bag inserted into annular gap 21C The decorator bag may be squeezed to extrude spreadable material 40 through nozzle 42 into gap 21C, thereby filling the gap with spreadable material. The top of edible layer 24 may also be covered with a layer of spreadable material 40 using ordinary kitchen utensils.

After those steps, the user can grasp handles 11 (FIG. 2D) on member 10 to simultaneously lift all three annular members 10, 12, and 14. Accordingly, the cake will now have three carefully aligned layers 20, 22, and 24, each with a uniform covering of spreadable material 40 as well as a uniform layer of spreadable material 40 between each layer.

Figure 7:
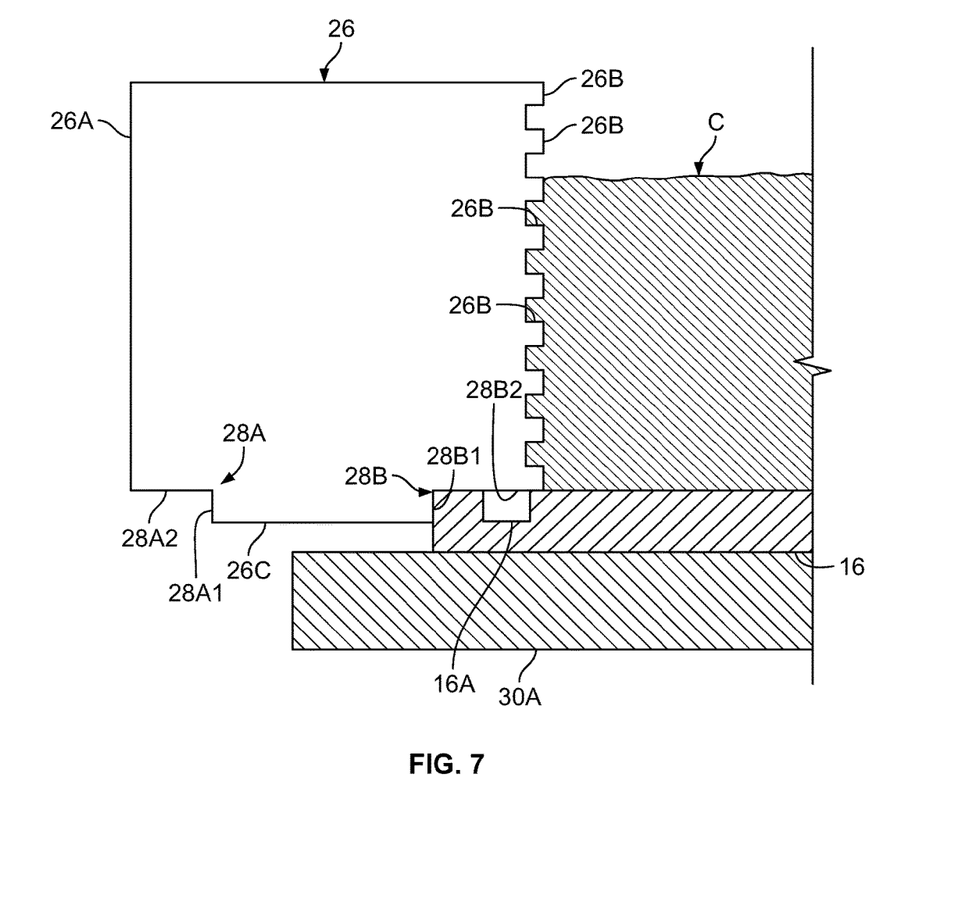
FIG. 7 is an elevational view, partly in section of the tray of FIG. 1 resting on a turntable and cooperating with a tool that is being used to shape spreadable material on edible goods.
Figure 8:
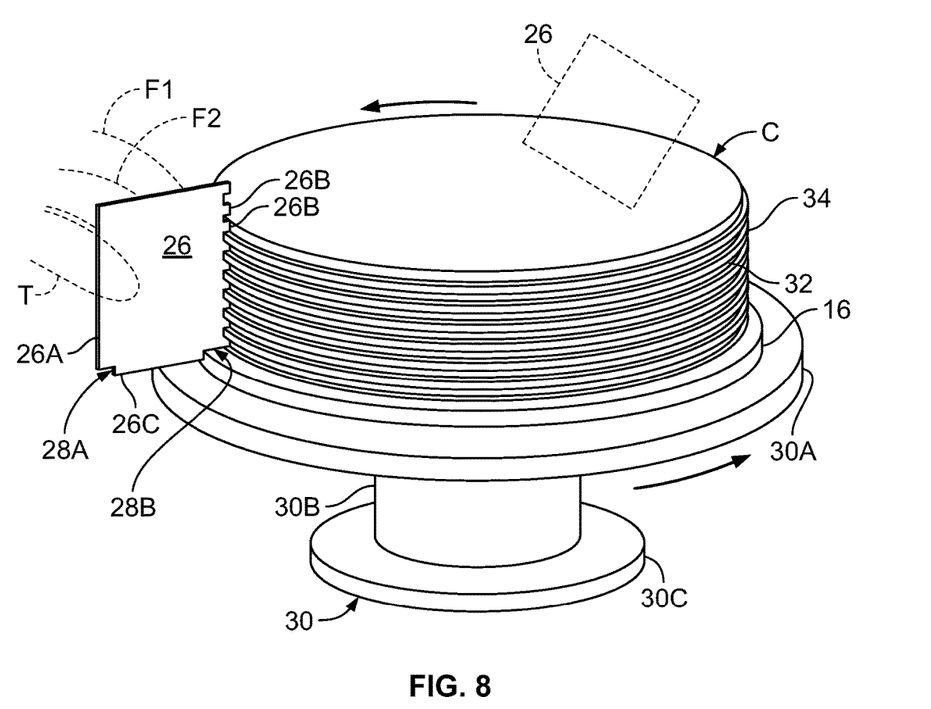
FIG. 8 is a perspective view of the arrangement of FIG. 6.

Referring to FIGS. 7 and 8, the previously mentioned edible layers (layers 20, 22, and 24 of FIG. 3), already covered on the outside and between layers with spreadable material (material 40 of FIG. 3), is identified as cake C. Cake C, while remaining on tray 16, has been transported and placed on platform 30A of turntable Tray 16 has been centered on platform 30A, and in some embodiments centering may be assisted with pins or ridges (not shown) on platform 30A. Turntable 30 has on its base 30C a pedestal 30B that rotatably supports platform 30A.

A tool 26 is shown as a thin stainless steel plate having a surface finishing edge 26A, basically a straight edge. Opposite edge 26A is an undulating, surface finishing edge shown with nine evenly spaced, rectangular teeth 26B, which are arranged in a column that is parallel to edge 26A. It will be appreciated that some embodiment may have teeth that are curved, and have a different pitch. Also, the overall dimensions of the tool can be chosen to accommodate cakes of various sizes.

Lower edge 26C has an opposite pair of guide notches 28A and 28B located below finishing edge 26A and teeth 26B, respectively. The roof 2862 of notch 28B is shown resting atop tray 16, and the notch's guiding edge 28B1 is shown pressed against the periphery of tray 16. With this orientation, notch 28B regulates the working depth of the finishing edge comprising teeth 26B. It will be understood that tool 26 is working on the cake's spreadable material (material 40 of FIG. 3).

In FIG. 8 a user grasps tool 26 with index finger F1 and middle finger F2 on one side, and thumb T on the opposite side. With the remaining hand the user can grasp the edge of platform 30A to rotate it, together with tray 16 and cake C in the indicated direction. (It will be appreciated that the hand placement and the direction of rotation can be reversed in some cases.) The rotation of cake C past tool 26 causes the seven lowermost teeth 26B to produce seven grooves 32 in the spreadable material on the side of the cake C. Six ridges 34 are simultaneously produced between the seven grooves 32. This production of ridges and grooves is sometimes referred to as combing. These ridges 34 and grooves 32 will be parallel and uniform because the working depth of tool 26 is regulated by notch 28B.

Tool 26 can be reversed with notch 28A pressed against the periphery of tray 16 so that straight finishing edge 26A bears against the side of cake C. Consequently, the side of cake C will be smooth and present essentially a simple cylindrical surface.

Tool 26 may also be used to smooth the top of cake C. In this instance, the straight finishing edge 26A of tool 26 is manually raked across the top of the cake (tool 26 now shown in phantom). If desired, the finishing edge of tool 26 having teeth 26B may be used to comb the top of cake C.

Figure 4:
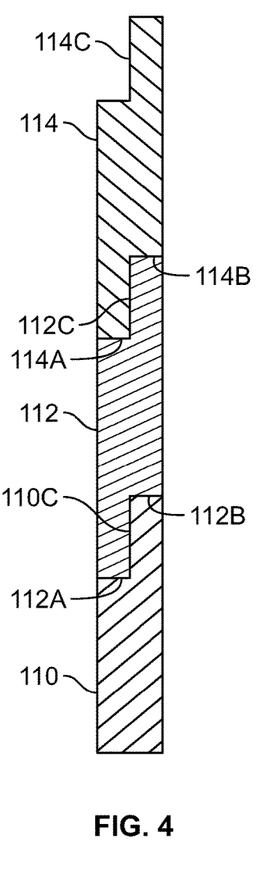
FIG. 4 is a cross-sectional view of annular members that are an alternative to that of FIG. 1.

Referring to FIG. 4, an alternative trio of annular members are shown in cross section. Components corresponding to those shown in FIG. 3 bear the same reference numerals but increased by 100. First annular member 110 is basically a cylindrical wall with a decreased thickness at top that forms cylindrical ridge 110C In this illustration, the inside of member 110 is to the right and is a simple cylindrical surface.

Second annular member 112 has a central cylindrical wall integral with lower retaining wall 112A and an upper, inside, cylindrical ridge 112C. Wall 112A is outwardly offset to produce a lower abutment 112B that rests atop ridge 110C. Third annular member 114 has a central cylindrical wall integral with lower retaining wall 114A and an upper, inside, cylindrical ridge 112C Wall 114A is outwardly offset to produce a lower abutment 112B that rests atop ridge 112C. Members 112 and 114 are identical. With this arrangement the inside surfaces of the stacked members 110, 112, and 114 present a smooth and essentially continuous surface.

In some embodiments, first member 110 can be changed to a simple cylindrical ring, similar to member 10 of FIG. 1. With this variation, the first member will have a uniform thickness; specifically, the thickness illustrated for ridge 110C.

Figure 5:
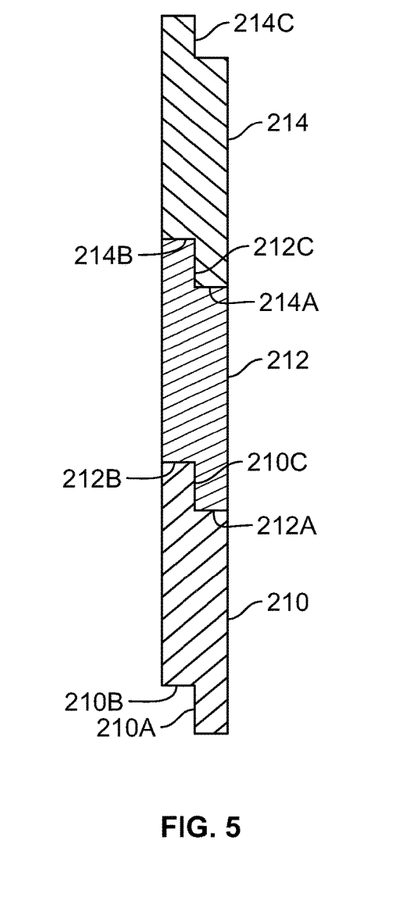
FIG. 5 is a cross-sectional view of annular members that are an alternative to those of FIGS. 1 and 4.

Referring to FIG. 5, an alternative trio of annular members are shown in cross section. Components corresponding to those shown in FIG. 4 bear the same reference numerals but increased by 100.

Annular members 210, 212, and 214 are identical. First annular member 210 has a central cylindrical wall integral with lower, inside, retaining wall 210A and an upper, lateral, cylindrical ridge 210C. In this illustration the inside of member 210 is to the left.

Second annular member 212 has a central cylindrical wall integral with lower retaining wall 212A and an upper cylindrical ridge 212C. Wall 212A is recessed on the outside to produce a lower abutment 212B that rests atop ridge 210C Upper ridge 212C is recessed on the inside. Third annular member 214 has a central cylindrical wall integral with lower retaining wall 214A and an upper cylindrical ridge 212C Wall 214A is recessed on the outside to produce a lower abutment 214B that rests atop ridge 212C. With this arrangement the inside surfaces of the stacked members 210, 212, and 214 present a smooth and essentially continuous surface.

Figure 6:
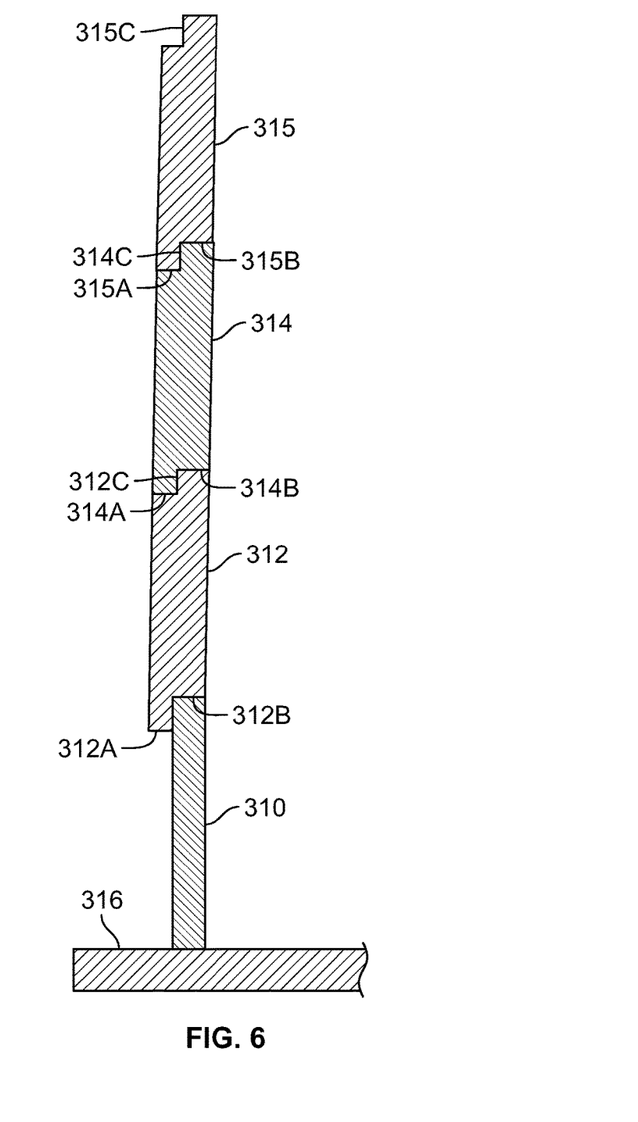
FIG. 6 is a cross-sectional view of annular members that are an alternative to those of FIGS. 1, 4, and 5.

Referring to FIG. 6, an alternative trio of annular members are shown in cross section. Components corresponding to those shown in FIG. 5 bear the same reference numerals but increased by 100.

First annular member 310 is a simple cylindrical ring, similar to member 10 of FIG. 1. Member 310 has similar handles, although they are not visible in this view. Annular members 312, 314 and 315 are identical. In this illustration the insides of members 310, 312, 314 and 315 are to the right.

Second annular member 312 has a central cylindrical wall integral with lower, outside, retaining wall 312A and an upper, inside, cylindrical ridge 312C. Wall 312A is recessed on the inside to produce a lower abutment 312B that rests atop member 310. Upper ridge 312C is recessed on the outside.

Third annular member 314 has a central cylindrical wall integral with lower retaining wall 314A and an upper cylindrical ridge 314C. Wall 314A is recessed on the inside to produce a lower abutment 314B that rests atop ridge 312C. Upper ridge 314C is recessed on the outside.

Fourth annular member 315 has a central cylindrical wall integral with lower retaining wall 315A and an upper cylindrical ridge 315C. Wall 315A is recessed on the inside to produce a lower abutment 315B that rests atop ridge 314C. With this arrangement the inside surfaces of the stacked members 310, 312, 314, and 315 present a smooth and essentially continuous surface.

It is appreciated that various modifications may be implemented with respect to the above described embodiments. While the foregoing annular members are basically cylindrical, in other embodiments the outline of the annular member can be polygonal, oval, crescent shaped, or other complex shapes. Instead of retaining walls to keep the annular members aligned, some embodiments may employ a tongue and groove joint, external latches, a beveled joint, etc. While the foregoing annular members had uninterrupted retaining walls, alternative embodiments may employ instead a discrete number of dependent fingers or tabs to keep the annular members aligned. In some embodiments the annular members may be flared to facilitate insertion of spreadable material on the side of the edible layers. In other embodiments the annular members may have successively smaller diameters (or transverse dimensions) and interconnecting flanges that allow one to build a cake with successively smaller tiers. In addition, the disclosed tool may have finishing edges with a sawtooth profile or a profile that is sinuous, bowed (concave or convex), etc. While a turntable was described for facilitating the finishing of the side of the cake, in some cases this finishing will be done freehand and without turning the cake. In still other cases, no additional finishing will be performed after the annular members are removed from around the cake. In some embodiments the inside of the annular member will be fluted or may have inwardly projecting teeth to engrave vertical grooves in the cake's spreadable material as the annular members are lifted off the cake.

Obviously, many modifications and variations of the present invention are possible in light of the above teachings. It is therefore to be understood that within the scope of the appended claims, the invention may be practiced otherwise than as specifically described.

The invention claimed is:

1. A method for finishing a plurality of edible layers with spreadable material using a plurality of annular members, a given pair of the annular members having an interconnectable pair of rims, one of the given pair having an inward or outward jog that provides an abutment adjacent to and extending away from a retaining wall, a first one of the given pair of annular members having an outwardly projecting pair of handles, the method comprising the steps of:

placing a first one of the plurality of edible layers inside the first one of the given pair of annular members, leaving an annular gap between them sized to admit the spreadable material;

applying the spreadable material atop and laterally to the first one of the plurality of edible layers;

coaxially stacking the second one of the given pair of annular members upon the first one of the given pair of annular members with the retaining wall arranged to cause the given pair of annular members to align, the inner side of each of the plurality of annular members when stacked together presenting a substantially smooth and continuous surface;

centering a second one of the plurality of edible layers inside the second one of the given pair of annular members and atop the first one of the plurality of edible layers, leaving an annular gap between the second one of the plurality of edible layers and the second one of the given pair of annular members;

applying the spreadable material atop and laterally to the second one of the plurality of edible layers;

simultaneously lifting the plurality of annular members by the pair of handles to provide uniform application of the spreadable material on the plurality of edible layers after they are stacked; and separating the plurality of annular members and reusing them.

2. A method according to claim 1 comprising the step of:

grasping the first one of the given pair of annular members and lifting it together with the second one of the given pair of annular members.

3. A method according to claim 1 wherein the second one of the given pair of annular members has the abutment and the retaining wall, the retaining wall extending below the abutment, the step of coaxially stacking the second one of the given pair of annular members being performed by:

resting the abutment on top of the first one of the given pair of annular members with the retaining wall laterally engaging the first one of the given pair of annular members.

4. A method according to claim 1 employing a tool with a surface finishing edge, the method including the step of:

after lifting the plurality of annular members, dragging the surface finishing edge peripherally around the first and the second one of the plurality of edible layers to surficially finish the spreadable material on them.

5. A method according to claim 4 employing a turntable, wherein the step of dragging the surface finishing edge is performed by:

placing the first and the second one of the plurality of edible layers on the turntable and rotating the turntable while pressing the surface finishing edge against the spreadable material.

6. A method according to claim 1 employing a tray and comprising the step of:

installing the first one of the given pair of annular members onto the tray before the step of placing the first one of the plurality of edible layers inside the first one of the given pair of annular members.

7. A method according to claim 6 employing a turntable and a tool with a surface finishing edge, the method comprising the steps of:

after lifting the plurality of annular members, placing the tray and the first and the second one of the plurality of edible layers on the turntable; and rotating the turntable while dragging the surface finishing edge against the spreadable material on the first and the second one of the plurality of edible layers.

8. A method according to claim 7 wherein the tool has a guiding edge, the step of dragging the surface finishing edge being performed by pressing the guiding edge peripherally against the tray to give the tool a regulated working depth.

9. A kit for finishing a plurality of edible layers with spreadable material, comprising:
a plurality of annular members, a first one of them having an outwardly projecting pair of handles, each of the plurality of annular members being coaxially stackable and being separable after stacking for reuse, each of the plurality of annular members when stacked being sized to encompass a corresponding one of the plurality of edible layers and leave an annular gap sized to admit the spreadable material, a given pair of the annular members having an interconnectable pair of rims, the given pair of the annular members each having an inner side, one of the pair of rims having an inward or outward jog that provides an abutment adjacent to and extending away from a retaining wall, the retaining wall arranged to cause the given pair of annular members to align, the inner side of each of the plurality of annular members when stacked together presenting a substantially smooth and continuous surface that allows simultaneous lifting of the plurality of annular members by the pair of handles to provide uniform application of the spreadable material on the plurality of edible layers when they are stacked.

10. A kit according to claim 9 wherein at least some of the plurality of annular members have a lower abutment, the retaining wall extending below the lower abutment.

11. A kit according to claim 9 comprising:
a tray having a receptacle for receiving the first one of the plurality of annular members.

12. A kit according to claim 9 comprising:
a tool with a surface finishing edge for shaping spreadable material on the plurality of annular members.

13. A kit according to claim 12 comprising:
a tray having a receptacle for receiving the first one of the plurality of annular members, the tray having a periphery extending around the receptacle, the tool having a guiding edge adapted to be peripherally pressed against any position along the periphery of the tray to give the tool a regulated working depth.

14. A kit according to claim 13 comprising:
a turntable adapted to rotatably support the tray when holding the plurality of edible layers with spreadable material applied thereto, the guiding edge of the tool being adapted to slide around the tray peripherally as the turntable turns.

15. A kit according to claim 9, wherein the at least some of the plurality of annular members have an upper wall with a thickness approximately the same as the retaining wall, the jog existing between the upper wall and the retaining wall for forming the abutment.

16. A kit according to claim 9 wherein at least some of the plurality of annular members have an upper wall with a thickness exceeding that of the retaining wall, the upper wall and the retaining wall each having a surface that is aligned, one to the other, a step existing between the upper wall and the retaining wall for forming the abutment.

17. A kit according to claim 9 comprising:
a tool with an opposite pair of finishing edges, one being straight, the other having a plurality of teeth aligned along a straight line.

18. A kit according to claim 11 comprising:
a tool having a plate with an opposite pair of finishing edges, one being straight, the other undulating, the pair of finishing edges being adapted to shape spreadable material on the plurality of edible layers, the plate having a lower edge between the opposite pair of finishing edges, the lower edge having an opposite pair of guide notches, each adapted to press peripherally against the tray to give the plate a regulated working depth.

19. A kit according to claim 18 wherein the kit comprises:
a turntable adapted to rotatably support the tray when holding the plurality of edible layers with spreadable material applied thereto, each of the guide notches of the tool being adapted to slide around the tray peripherally as the turntable turns.

* * * * *